Sept. 8, 1931.  G. W. SCHULTZ  1,822,545
SNOWPLOW
Filed Nov. 4, 1929
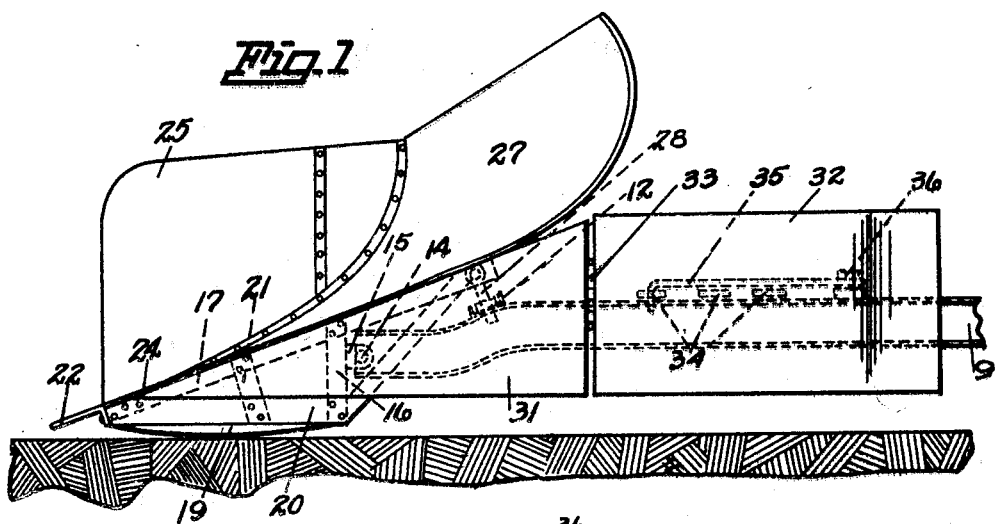
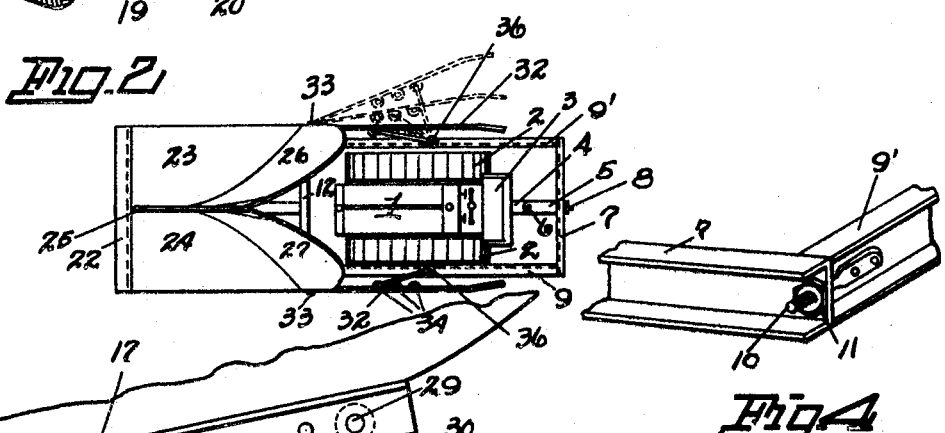
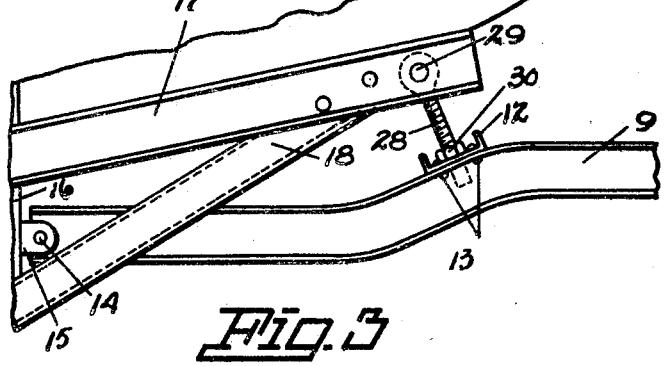
GEORGE W. SCHULTZ
Inventor
By  Herbert E. Smith
Attorney Patented Sept. 8, 1931

1,822,545

UNITED STATES PATENT OFFICE

GEORGE W. SCHULTZ, OF DAVENPORT, WASHINGTON

SNOWPLOW

Application filed November 4, 1929. Serial No. 404,553.

My present invention relates to an improved snow plow of the automotive type and utilized for clearing roads, highways, streets, &c., of the snow covering. In carrying out my invention I provide an excavating implement of this character that may with facility be coupled to a standard type of tractor from which the propulsion of the implement is derived, and the parts are so combined and arranged that the implement or snow plow may be detached or uncoupled from the tractor, leaving the latter free for use in various other ways after the snow has been cleared from the roads or highways.

The snow plow is composed of a minimum number of parts that are combined and arranged in such manner as to insure simplicity in manufacture, strength and durability for use, and efficiency in the clearing of the roadway and disposition of the ploughed snow, and the invention consists in certain novel combinations and arrangements of these parts as will hereinafter be more fully set forth and claimed.

In the accompanying drawings I have illustrated one complete example of the physical embodiments of my invention wherein the parts are combined and arranged according to the best mode I have so far devised for the practical application of the principles of my invention.

Figure 1 is a view in side elevation of the snow plow. Figure 2 is a plan view of the plow coupled with a tractor. Figure 3 is an enlarged detail showing the adjusting means for the plow, and Figure 4 is a detail perspective at one corner of the draft frame.

In Figure 2 of the drawings where the tractor is outlined, its motor is indicated by the numeral 1, with the wheel substitutes or traction belts 2, 2, and seat 3 for the driver of the implement. At the rear of the tractor the usual coupling bar 4 projects along its longitudinal center, and is coupled to the link 5 by the coupling pin 6, the latter being used for conveniently coupling and uncoupling the snow plow to and from the tractor.

A rectangular draft frame surrounds the tractor and supports the snow plow, and this frame comprises a rear, transversely extending draft bar 7, of channel shape, to which the coupling link 5 is bolted at 8. Two channel side bars 9 and 9' of the draft frame are bolted at their rear ends to the transverse draft bar by means of bolts 10 and nuts 11, and it will be apparent in Figure 2 that the bolted ends of the draft bar are disconnected from the side bars to permit the tractor to back out of the rectangular frame, after the coupling pin 6 has been removed. In assembling the parts of the implement for use, the tractor is propelled into the enclosing frame, after which the draft bar and coupling pin are properly connected with their adjoining parts.

At its forward or front end the draft frame is provided with a cross brace 12, also a channel plate, and elbow bends are provided in the side bars at the approximate portions of these bars where the cross brace is riveted, as at 13. When the rear channel bar or draft bar 7 is secured by the nuts 11 to the bolts 10 of the side bars the rectangular draft frame forms a rigid enclosure for the tractor and transmits the power from the tractor to the snow plow.

As best seen in Figure 3 the front ends of the side bars project forward of the front rigid cross bar 12 and pivot pins 14 pass through brackets 15 and holes in the ends of the side bars for permitting adjustment of the snow plow.

The brackets are riveted or otherwise secured to a pair of spaced, vertically arranged braces 16, which, at their upper ends are rigidly secured to channel-iron side bars 17 of the plow, and a pair of diagonally extending braces 18 join the lower ends of the vertical braces and the rear ends of the side bars 17 of the plow.

At opposite sides of the plow are arranged a pair of longitudinally extending shoes or runners 19 having curved under faces for skimming over the roadway and supporting the plow in front of its pivots 14, and these runners are riveted or bolted to side plates 20, which plates are bolted or riveted to the side bars of the plow-frame at their front ends, to the lower ends of the vertical braces 16, to the diagonal braces 18, and also to the lower ends of reinforcing braces 21 that connect the side plates and runners with the side bars of the plow frame, to form a rigid, durable and strong support for the plow.

Across the front of the plow frame, a flanged scraper plate or plow point 22 is bolted or riveted, and the plow per se, as seen in Figure 2, is built up in rectangular shape on the top of its frame heretofore described.

At the rear of the scraper plate the plow comprises a pair of flat plates 23 and 24 mounted on the frame and divided by the central partition 25 forming a ploughshare or dividing plate and from these flat plates the plow merges into a pair of mold boards 26 and 27, which as shown in Figure 1 rise from the inclined plow frame and curve upwardly with an outwardly flaring formation designed to guide the snow to the right and left of the implement where the snow may be dumped as the implement moves over the roadway.

To adjust the plow and raise or lower the plow point 22 with relation to the surface of the roadway I use a pair of screw bars as 28 that are pivoted at 29 on the two side bars 17 of the snow-plow frame. These screw bars are pivoted at the rear ends of the side bars on their inner sides and the free ends of the screw bars or pivoted bolts are passed through bolt holes in the front cross plate 12, and they are locked by the use of nuts 30, above and below the plate.

Along the sides of the plow are extended triangular shaped plates 31 secured to the plow frame and vertically disposed to form fixed landsides for the plow, and as seen in Figure 1 these fixed landsides terminate at their rear ends just short of the rear ends of the mold boards of the plow. In addition to the fixed landsides, I utilize adjustable, hinged, landsides 32 of rectangular shape, vertically disposed and hinged at 33 to the rear ends of the fixed landsides.

On their inner sides the hinged landsides are provided with a series of eyebolts 34 which may be selected for use with hooks 35 that are pivoted at 36 on the side bars of the draft frame. These adjustable landsides are designed especially for use in removing light snows from the roadway, at which time they are adjusted and braced to flare outwardly, as indicated by dotted lines in Figure 2. When the snow fall is too heavy for use of the adjustable landsides they may be folded in to the draft frame as indicated in full lines Figure 2.

Having thus fully described my invention, what I claim is:—

The combination with a draft frame, a plow frame having spaced runners and pivoted to the draft frame, and means for holding the frames in adjusted position, of a plow comprising flat upwardly inclined plates and a central, upright plate forming a plow share between the flat plates, said flat plates terminating in upwardly curved and outwardly flared moldboards, fixed landsides carried by the plow frame, hinged landsides at the rear of the fixed landsides, and adjustable links between the draft frame and hinged landsides for holding the latter in adjusted lateral position.

In testimony whereof I affix my signature.

GEORGE W. SCHULTZ.